March 17, 1970  SHIGERU MATSUBARA ET AL  3,500,730
FILTER CONTROL DEVICE
Filed Sept. 18, 1967

INVENTORS
SHIN FUJISAWA
SHIGERU MATSUBARA

BY *Sughrue, Rothwell, Mion, Zinn & Macpeak*
ATTORNEYS

United States Patent Office 3,500,730
Patented Mar. 17, 1970

3,500,730
FILTER CONTROL DEVICE
Shigeru Matsubara and Shin Fujisawa, Chuo-ku, Tokyo, Japan, assignors to Fuji Shashin Film Kabushiki Kaisha, Ashigara-Kamigum, Kanagawa, Japan
Filed Sept. 18, 1967, Ser. No. 668,406
Claims priority, application Japan, Sept. 30, 1966, 41/64,436
Int. Cl. G01j 1/00, 1/50, 1/42
U.S. Cl. 95—10      4 Claims

ABSTRACT OF THE DISCLOSURE

A filter control device has a correcting filter assembly comprising a set of types of different spectral characteristics, each filter of which is brought in and out of the optical axis for color correction in accordance with the spectral characteristics of the condition of illumination of the object to be photographed and in accordance with the type of film used. Two photoelectric elements are disposed in a bridge circuit in cooperative relationship with two filters, thereby detecting the condition of illumination and activating a relay switch. A second switch is set, according to the type of film used, and causes a motor means to more a set of filters into alignment with a photocell and the lens of the camera in response to movement of the relay in the bridge circuit.

---

This invention relates to a control device for controlling a filter to correct the spectral transfer characteristics of a camera lens system depending on the characteristics of the condition of illumination of an object to be photographed and the spectral characteristics of the film.

It is known to set a filter in the lens system of a camera to match the spectral components of the light incident on the camera to the spectral sensitivity of the photographic film. It has not been a practice, however, to automatically control the color correcting filter in accordance with the spectral characteristics of illumination. For instance, in Japanese patent publication No. 12,834/1966, the correction filter for illumination conditions is manually set by the operator in accordance with illumination conditions, such as daylight or tungsten and for this reason, there is the possibility of improper correction due to the error on the part of the operator.

This invention concerns a filter control device comprising means attached to such a camera to measure the spectral characteristics of illumination with said measuring means being interlocked with the correction filter, thereby eliminating the necessity of manual operation.

Figure 1:
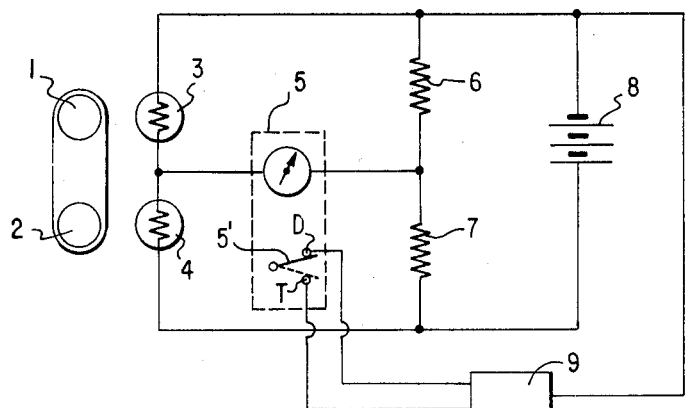
Figure 2:
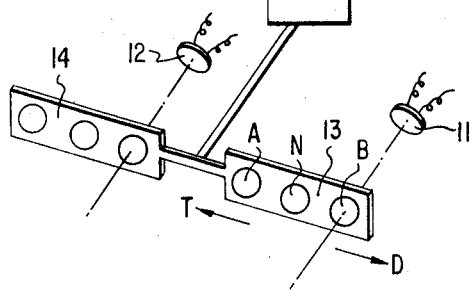
Figure 2:
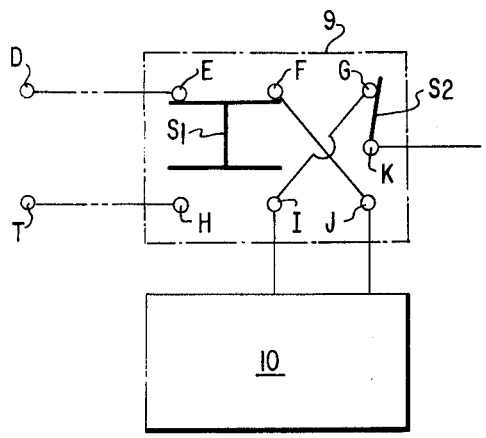

The invention will now be described with reference to the drawings, in which:

FIGURE 1 is a diagram of an electric circuit and related components embodying the invention, and FIGURE 2 is an enlarged diagram of a switch means used therein.

In the drawings, the device includes filters 1 and 2 of different spectral characteristics, integral or separate photographic elements 3 and 4, meter relay 5, relay switch 5', resistors 6 and 7 and power supply 8. The photoelectric elements 3 and 4, meter relay 5, resistors 6 and 7 and power source 8 form generally a bridge circuit, as shown. A selection switch 9 operates automatically, depending on types of the spectral characteristics of the film. A motive power device 10, such as a solenoid magnet or a motor, drives the color correcting fibers. The device is employed with camera lens 11 and photoelectric element 12 for exposure control. A plurality of color correcting filters 13 form an assembly and match the camera lens 11, for example, a half-tone gray filter (N) at the center with an amber (A) type filter and a blue (B) type filter on either side. A set of light intensity compensating filters 14 form an assembly having the same composition as color correction filters 13 and matching the photoelectric element 12. These filters 13 and 14 are connected to the motive power device 10 and driven so as to effect identical correction to lens 11 and photoelectric element 12, respectively.

The operation and effect of the invention will now be described. It is assumed that a film of tungsten type is charged in the camera. The magazine for the tungsten type film is provided with means (not shown) for setting the switch 9 for tungsten during the charging operation so that, for example, charging of the tungsten type film places switch $S_1$ on contact EF and switch $S_2$ on contact G. One of the filters 1 and 2 is a filter to pass wavelengths longer than red and the other to pass wavelengths shorter than blue, changing the light intensity falling onto photoelectric elements 3 and 4 according to the spectral characteristics of the illuminating light which may be tungsten light, daylight, etc. Thus, in case of illumination with tungsten light, the resistance of photoelectric elements 3 and 4 differ from each other and cause an unbalance of the bridge circuit to produce a current flow to operate the relay switch 5' of meter relay 5. The relay switch 5' engages contact T indicating that the illumination is of a tungsten light and since the contact H, short circuited to the contact T, is not in contact with switch $S_2$, as shown in FIGURE 2, no current will flow through the filter driving device 10 so that the color correction filter 13 remains unmoved, with the central gray filter (N) maintained on the optical axis. Now let us assume the illumination changes to daylight. The unbalance of the bridge circuit is now in the direction opposite to the above case, and the switch 5' of meter relay 5 operates oppositely to the above to engage contact D, indicating that the illumination is daylight. Since the contact E, short circuited to contact D, is connected to contact F through switch $S_1$, current flows through the color correcting filter driving device 10 to effect the shift onto the optical axis of the amber (A) filter for color temperature conversion for daylight. Thus, with a tungsten film being used, a fully automatic proper correction is made for either tungsten light or daylight illumination.

A description will now be made of the operation where a daylight type film is charged. During the charging of the daylight film, a film type indicating means provided on the film magazine (not shown) sets the switch 9 for daylight in the same way as before. Thus, in FIGURE 2, switch $S_1$ disengages the contacts E and F and engages contacts H and I, while switch $S_2$ disengages contact G and engages contact J.

The short circuit between contacts E and F is then broken and contacts H and I are short circuited, causing a current flow in the direction opposite to the case where a tungsten type film was used, so that the driving device 10 will move the correcting filter 13 in a direction opposite to the previous case. If the illumination is daylight and therefore no filter correction is necessary, the switch 5' of meter relay 5 is connected to contact D as before and since the contact E, shunted to contact D, is disconnected from switch $S_1$, no current will flow and the correcting filter 13 will not be moved, with filter N remaining on the optical axis, thus giving no correction effect. If the illumination now changes to a tungsten light, switch 5' engages with the contact T and current flows through contacts H and I connected to contact T to the driving devices in the opposite direction as compared with the above, so that the blue one of the correcting filters 13 is brought into the optical axis to effect proper correction.

As can be seen from the foregoing descriptions, the invention permits a fully automatic and proper correction for any condition of illumination and any of the tungsten and daylight types of films, without the necessity for the operator to correct for the spectral characteristics, thereby making the photographing operation very simple.

While the invention has been particularly shown and described with reference to a preferred embodiment thereof, it will be understood by those skilled in the art that various changes in form and details may be made therein without departing from the spirit and scope of the invention.

What is claimed is:

1. A filter control device for automatically positioning filters relative to a camera lens system or the like to correlate the spectral transfer characteristics of the camera lens system to the spectral condition of illumination of the object to be photographed and the spectral sensitivity of the film, said device comprising: filter means, means for supporting said filter means in operative relationship to said camera lens system and for movement relative thereto, motor means for moving said filter means relative to said lens system, a source of electrical energy for energizing said motor, first switch means responsive to film spectral sensitivity for controlling the direction of motor movement and second switch means responsive to the spectral characteristics of illumination falling on said object for selectively connecting said motor to said source of electrical power.

2. The device as claimed in claim 1 wherein said second switch means includes a bridge network having photoelectric elements in at least two legs, and relay operated switch means connected across said bridge network.

3. The device as claimed in claim 2 wherein said motor means and said bridge network are connected in parallel.

4. The device as claimed in claim 1 wherein said camera further includes a photoelectric element carried thereby and said filter means comprises first and second sets of spaced filters of different spectral characteristics, one of said series of filters being operatively associated with said lens system and said other series of filters being operatively associated with said photoelectric element, and means to correlate the individual filters within said sets such that movement of said filter means to correlate the separate transfer characteristics of the camera lens system automatically places the corresponding correct filter of the second set in position relative to said photoelectric element carried by said camera.

References Cited

UNITED STATES PATENTS

| 2,080,613 | 5/1937 | Lange | 350—311 XR |
| 3,208,363 | 9/1965 | Easterly et al. | 95—11 |
| 3,246,586 | 4/1966 | Hunt | 95—11 |

NORTON ANSHER, Primary Examiner

D. S. STALLARD, Assistant Examiner

U.S. Cl. X.R.

356—225